United States Patent
DeWitt, Jr. et al.

(10) Patent No.: US 7,290,255 B2
(45) Date of Patent: *Oct. 30, 2007

(54) AUTONOMIC METHOD AND APPARATUS FOR LOCAL PROGRAM CODE REORGANIZATION USING BRANCH COUNT PER INSTRUCTION HARDWARE

(75) Inventors: Jimmie Earl DeWitt, Jr., Georgetown, TX (US); Frank Eliot Levine, Austin, TX (US); Christopher Michael Richardson, Austin, TX (US); Robert John Urquhart, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 673 days.

This patent is subject to a terminal disclaimer.

(21) Appl. No.: 10/757,156

(22) Filed: Jan. 14, 2004

(65) Prior Publication Data

US 2005/0155025 A1    Jul. 14, 2005

(51) Int. Cl.
*G06F 9/45* (2006.01)
*G06F 9/44* (2006.01)
*G06F 7/38* (2006.01)
*G06F 11/00* (2006.01)

(52) U.S. Cl. ............... 717/158; 717/130; 717/159; 712/240; 714/45

(58) Field of Classification Search ............. 717/130, 717/158, 159; 712/240; 714/45
See application file for complete search history.

(56) References Cited

U.S. PATENT DOCUMENTS

| | | | |
|---|---|---|---|
| 4,291,371 A | 9/1981 | Holtey ................ 364/200 |
| 4,316,245 A | 2/1982 | Luu et al. | |
| 5,051,944 A | 9/1991 | Fetterolf et al. | |
| 5,103,394 A | 4/1992 | Blasciak ................ 395/575 |
| 5,142,634 A | 8/1992 | Fite et al. | |
| 5,212,794 A * | 5/1993 | Pettis et al. .......... 717/153 |
| 5,394,529 A | 2/1995 | Brown, III et al. | |

(Continued)

FOREIGN PATENT DOCUMENTS

JP    2000029731    12/1999

(Continued)

OTHER PUBLICATIONS

A. Ramirez, J. L. Larriba-Pey, and M. Valero. The effect of code reordering on branch prediction. Proceedings of the Intl. Conference on Parallel Architectures and Compilation Techniques, pp. 189—198, Oct. 2000.*

(Continued)

*Primary Examiner*—Tuan Dam
*Assistant Examiner*—Derek J. Rutten
(74) *Attorney, Agent, or Firm*—Duke W. Yee; Herman Rodriguez; Gerald H. Glanzman (57) ABSTRACT

A method, apparatus, and computer instructions for local program reorganization using branch count per instruction hardware. In a preferred embodiment, a hardware counter is used in the present invention to count the number of times a branch is taken when branch instructions are executed. Branch count statistics generated from the hardware counters are available to a program in order to analyze whether code reorganization is necessary. If reorganization is necessary, the program autonomically reorganizes instructions locally at run time to allow more instructions to be executed prior to taking a branch, so that the number of branches taken is minimized without modifying underlying program code.

15 Claims, 3 Drawing Sheets

U.S. PATENT DOCUMENTS

| | | | |
|---|---|---|---|
| 5,581,778 A | | 12/1996 | Chin et al. |
| 5,659,679 A | * | 8/1997 | Alpert et al. .................. 714/34 |
| 5,689,712 A | | 11/1997 | Heisch ........................ 395/704 |
| 5,691,920 A | | 11/1997 | Levine et al. .......... 364/551.01 |
| 5,752,062 A | | 5/1998 | Gover et al. |
| 5,768,500 A | | 6/1998 | Agrawal et al. |
| 5,774,724 A | | 6/1998 | Heisch ........................ 395/704 |
| 5,794,028 A | * | 8/1998 | Tran ............................ 712/240 |
| 5,930,508 A | | 7/1999 | Faraboschi et al. ......... 395/706 |
| 5,937,437 A | | 8/1999 | Roth et al. .................. 711/202 |
| 5,938,760 A | | 8/1999 | Levine et al. |
| 5,938,778 A | | 8/1999 | John, Jr. et al. .............. 714/45 |
| 5,940,618 A | | 8/1999 | Blandy et al. |
| 5,950,003 A | | 9/1999 | Kaneshiro et al. |
| 5,950,009 A | * | 9/1999 | Bortnikov et al. .......... 717/158 |
| 5,966,537 A | | 10/1999 | Ravichandran ............. 395/709 |
| 5,966,538 A | | 10/1999 | Granston et al. |
| 5,970,439 A | | 10/1999 | Levine et al. |
| 5,987,250 A | | 11/1999 | Subrahmanyam ........... 395/704 |
| 6,006,033 A | * | 12/1999 | Heisch ........................ 717/158 |
| 6,026,235 A | | 2/2000 | Shaughnessy |
| 6,070,009 A | | 5/2000 | Dean et al. .................. 395/704 |
| 6,101,524 A | | 8/2000 | Choi et al. ................... 709/102 |
| 6,119,075 A | * | 9/2000 | Dean et al. .................. 702/186 |
| 6,134,676 A | | 10/2000 | VanHuben et al. ........... 714/39 |
| 6,189,141 B1 | * | 2/2001 | Benitez et al. ............... 717/153 |
| 6,189,142 B1 | | 2/2001 | Johnston et al. |
| 6,192,513 B1 | | 2/2001 | Subrahmanyam ............... 717/5 |
| 6,206,584 B1 | * | 3/2001 | Hastings ...................... 714/35 |
| 6,223,338 B1 | | 4/2001 | Smolders ........................ 717/4 |
| 6,233,679 B1 | * | 5/2001 | Holmberg ................... 712/240 |
| 6,237,141 B1 | * | 5/2001 | Holzle et al. ................ 717/153 |
| 6,243,804 B1 | | 6/2001 | Cheng ......................... 712/228 |
| 6,256,775 B1 | | 7/2001 | Flynn ............................ 717/4 |
| 6,286,132 B1 | | 9/2001 | Tanaka et al. .................. 717/4 |
| 6,324,689 B1 | | 11/2001 | Lowney et al. .................. 717/9 |
| 6,330,662 B1 | | 12/2001 | Patel et al. .................. 712/236 |
| 6,351,844 B1 | * | 2/2002 | Bala ............................ 717/128 |
| 6,374,364 B1 | | 4/2002 | McElroy et al. .............. 714/10 |
| 6,430,741 B1 | | 8/2002 | Mattson, Jr. et al. ........ 717/154 |
| 6,442,585 B1 | | 8/2002 | Dean et al. ................... 709/108 |
| 6,446,029 B1 | | 9/2002 | Davidson et al. ............ 702/186 |
| 6,480,938 B2 | | 11/2002 | Vondran, Jr. .................. 711/125 |
| 6,505,292 B1 | * | 1/2003 | Witt ............................ 712/207 |
| 6,542,985 B1 | | 4/2003 | Johnson et al. |
| 6,594,820 B1 | | 7/2003 | Ungar |
| 6,631,514 B1 | * | 10/2003 | Le ............................... 717/137 |
| 6,961,925 B2 | | 11/2005 | Callahan, II et al. |
| 7,181,723 B2 | | 2/2007 | Luk et al. |
| 2001/0032305 A1 | | 10/2001 | Barry ........................... 712/34 |
| 2002/0019976 A1 | | 2/2002 | Patel et al. .................. 717/137 |
| 2002/0073406 A1 | * | 6/2002 | Gove .......................... 717/154 |
| 2002/0124237 A1 | | 9/2002 | Sprunt et al. ................ 717/127 |
| 2002/0129309 A1 | | 9/2002 | Floyd et al. ................. 714/724 |
| 2002/0147965 A1 | | 10/2002 | Swaine et al. ............... 717/124 |
| 2002/0157086 A1 | | 10/2002 | Lewis et al. |
| 2002/0199179 A1 | | 12/2002 | Lavery et al. ............... 717/158 |
| 2003/0014741 A1 | * | 1/2003 | Megiddo et al. ............ 717/158 |
| 2003/0040955 A1 | | 2/2003 | Anaya et al. |
| 2003/0066055 A1 | | 4/2003 | Spivey |
| 2003/0131343 A1 | | 7/2003 | French et al. |
| 2004/0194076 A1 | | 9/2004 | Comp et al. |
| 2004/0268316 A1 | | 12/2004 | Fisher et al. |
| 2005/0071515 A1 | | 3/2005 | DeWitt, Jr. et al. |
| 2005/0071516 A1 | | 3/2005 | Levine et al. |
| 2005/0071608 A1 | | 3/2005 | Levine et al. |
| 2005/0071609 A1 | | 3/2005 | Levine et al. |
| 2005/0071610 A1 | | 3/2005 | DeWitt, Jr. et al. |
| 2005/0071611 A1 | | 3/2005 | DeWitt, Jr. et al. |
| 2005/0071612 A1 | | 3/2005 | DeWitt, Jr. et al. |
| 2005/0071816 A1 | | 3/2005 | Levine et al. |
| 2005/0071817 A1 | | 3/2005 | Dewitt, Jr. et al. |
| 2005/0071821 A1 | | 3/2005 | Levine et al. |
| 2005/0071822 A1 | | 3/2005 | DeWitt, Jr. et al. |
| 2005/0154867 A1 | | 7/2005 | DeWitt, Jr. et al. |
| 2005/0155030 A1 | | 7/2005 | DeWitt, Jr. et al. |

FOREIGN PATENT DOCUMENTS

| | | |
|---|---|---|
| JP | 2000347863 | 12/2000 |

OTHER PUBLICATIONS

Yang, M., Uh, G., and Whalley, D. B. 1998. Improving performance by branch reordering. In Proceedings of the ACM SIGPLAN 1998 Conference on Programming Language Design and Implementation (Montreal, Quebec, Canada, Jun. 17-19, 1998). A. M. Berman, Ed. PLDI '98. ACM Press, New York, NY, 130-141.*

Conte, T. M., Menezes, K. N., and Hirsch, M. A. 1996. Accurate and practical profile-driven compilation using the profile buffer. In Proceedings of the 29th Annual ACM/IEEE international Symposium on Microarchitecture (Paris, France, Dec. 2-4, 1996). International Symposium on Microarchitecture. IEEE Computer Society, Washington, DC, 36-45.*

Conte, T. M., Patel, B. A., and Cox, J. S. 1994. Using branch handling hardware to support profile-driven optimization. In Proceedings of the 27th Annual international Symposium on Microarchitecture (San Jose, California, United States, Nov. 30-Dec. 2, 1994). MICRO 27. ACM Press, New York, NY, 12-21.*

Fisher, J.A., "Trace Scheduling: A Technique for Global Microcode Compaction," Computers, IEEE Transactions on, vol. C-30, No. 7pp. 478-490, Jul. 1981.*

Chang, P. P., Mahlke, S. A., and Hwu, W. W. 1991. Using profile information to assist classic code optimizations, Softw. Pract. Exper. 21, 12 (Dec. 1991), 1301-1321.*

Schmidt et al. "Profile-directed restructuring of operating system code", 1998, IBM Systems Journal, vol. 37, No. 2, pp. 270-297.*

Aho et al. "Compilers: Principles, Techniques, and Tools", 1988, Addison-Wesley, pp. 488-497.*

Cohen et al., "Hardware-Assisted Characterization of NAS Benchmarks", Cluster Computing, V I. 4, No. 3, Jul. 2001, pp. 189-196.

Talla et al., "Evaluating Signal Processing and Multimedia Applications on SIMD, VLIW and Sup r Scalar Architectures", International Conference on Computer Design, Austin, Sep. 17-20, 2000, pp. 163-172.

Iwasawa et al., "Parallelization Method of Fortran DO Loops by Parallelizing Assist System", Transactions of Information Processings Society of Japan, vol. 36, No. 8, Aug. 1995, pp. 1995-2006.

Talla et al., "Execution Characteristics of Multimedia Applications on a Pentium II Processor", IEEE International Performance, Computing, and Communications Conference, 19th, Phoenix, F b. 20-22, 2000, pp. 516-524.

IBM Research Disclosure Bulletin 444188, "Enable Debuggers as an Objective Performanc Measurement Tool for Software Development Cost Reduction", Apr. 2001, pp. 686-688.

U.S. Appl. No. 09/435,069, Davidson et al., Method and Apparatus for Instruction Sampling for Performance Monitoring and Debug, filed Nov. 4, 1999.

U.S. Appl. No. 08/538,071, Gover et al., Method and System for Selecting and Distinguishing an Event Sequence using an Effective Address in a Pr cessing System, filed Oct. 2, 1995.

INTEL, "INTEL IA-64 Architecture Software Developer's Manual", Revision 1.1, vol. 4, No. 245320.002, Jul. 2001.

* cited by examiner

AUTONOMIC METHOD AND APPARATUS FOR LOCAL PROGRAM CODE REORGANIZATION USING BRANCH COUNT PER INSTRUCTION HARDWARE

CROSS REFERENCE TO RELATED APPLICATIONS

The present invention is related to the following applications entitled "Method and Apparatus for Counting Instruction Execution and Data Accesses", Ser. No. 10/675,777, filed on Sep. 30, 2003; "Method and Apparatus for Selectively Counting Instructions and Data Accesses", Ser. No. 10/674,604, filed on Sep. 30, 2003; "Method and Apparatus for Generating Interrupts Upon Execution of Marked Instructions and Upon Access to Marked Memory Locations", Ser. No. 10/675,831, filed on Sep. 30, 2003; "Method and Apparatus for Counting Data Accesses and Instruction Executions that Exceed a Threshold", Ser. No. 10/675,778, filed on Sep. 30, 2003; "Method and Apparatus for Counting Execution of Specific Instructions and Accesses to Specific Data Locations", Ser. No. 10/675,776, filed on Sep. 30, 2003; "Method and Apparatus for Debug Support for Individual Instructions and Memory Locations", Ser. No.10/675,751, filed on Sep. 30, 2003; "Method and Apparatus to Autonomically Select Instructions for Selective Counting", Ser. No. 10/675,721, filed on Sep. 30, 2003; "Method and Apparatus to Autonomically Count Instruction Execution for Applications", Ser. No. 10/674,642, filed on Sep. 30, 2003; "Method and Apparatus to Autonomically Take an Exception on Specified Instructions", Ser. No. 10/674,606, filed on Sep. 30, 2003; "Method and Apparatus to Autonomically Profile Applications", Ser. No. 10/675,783, filed on Sep. 30, 2003; "Method and Apparatus for Counting Instruction and Memory Location Ranges", Ser. No. 10/675,872, filed on Sep. 30, 2003; "Autonomic Method and Apparatus for Counting Branch Instructions to Improve Branch Predictions", Ser. No. 10/757,237, filed on Jan. 14, 2007; and "Autonomic Method and Apparatus for Hardware Assist for Patching Code", Ser. No. 10/757,171, filed on Jan. 14, 2004. All of the above related applications are assigned to the same assignee, and incorporated herein by reference.

BACKGROUND OF THE INVENTION

1. Technical Field

The present invention relates generally to an improved data processing system and, in particular, to a method and system for improving performance of the processor in a data processing system. Still more particularly, the present invention relates to a method, apparatus, and computer instructions for local code reorganization using branch count per instruction hardware.

2. Description of Related Art

In a computer system, branch prediction is a technique used to guess whether a conditional branch will be taken or not. If it is predicted that a conditional branch will be taken, the processor will prefetch code for the branch instruction from the appropriate location. A speculative execution is performed to take advantage of branch prediction by executing the instruction before the processor is certain that they are in the correct execution path. For example, if a branch is taken more than 90 percent of the time, it is predicted to be taken and the processor will prefetch the code prior to reaching the branch instruction.

A branch instruction may be conditional or unconditional. A conditional branch instruction causes an instruction to branch or jump to another location of code if a specified condition is satisfied. If the condition is not satisfied, the next instruction in sequential order is fetched and executed.

A special fetch/decode unit in a processor uses a branch prediction algorithm to predict the direction and outcome of the instructions being executed through multiple levels of branches, calls, and returns. Branch prediction enables the processor to keep the instruction pipeline full while running at a high rate of speed. In conventional computer systems, branch prediction is based on branch prediction software that uses branch statistics and other data to minimize stalls caused by delays in fetching instructions that branch to nonlinear memory locations.

In some cases, the code of a program can be locally reorganized to improve performance. Such code reorganization is typically based on software generated statistics to determine whether local code reorganization is advantageous. However, such software generated statistics require use of resources that may in some cases be better allocated to other tasks, while hardware resources that may be present go unused, resulting in an inefficient use of overall resources.

Therefore, it would be advantageous to have an improved method, apparatus, and computer instructions for providing branch count per instruction statistics that allow a program to autonomically perform local code reorganization, so that processor performance may be optimized.

SUMMARY OF THE INVENTION

The present invention provides a method, apparatus, and computer instructions for local program code reorganization at run time using branch count per instruction hardware. In a preferred embodiment, the mechanism of the present invention allows a program to analyze branch count per instruction statistics generated using hardware counters. The branch count per instruction statistics identify the number of times a branch is actually taken when a branch instruction is executed.

Based on the branch count per instruction statistics, the program autonomically determines whether the code requires reorganization in order to optimize processor performance. The program may reorganize the code by swapping location of an "if/then/else" statement locally so that more instructions may be executed contiguously prior to taking the branch. This run time code reorganization minimizes the number of branches taken without modifying the underlying application code.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention provides a method, apparatus, and computer instructions for local program code reorganization at run time using branch count per instruction hardware. The present invention provides hardware counters to count the number of times a branch is actually taken when a branch instruction is executed.

Figure 1:
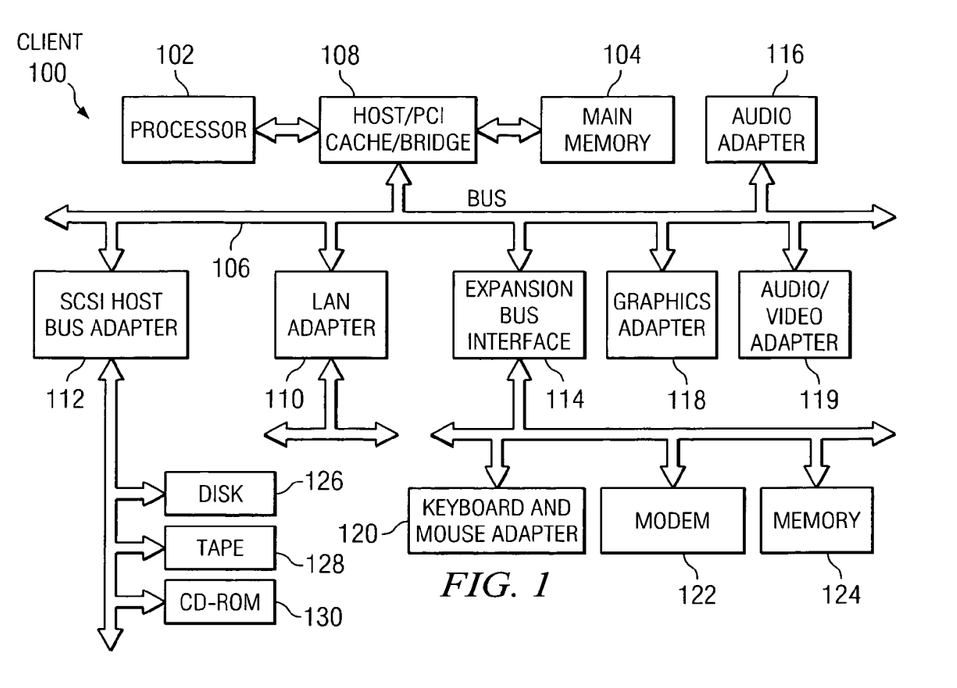
FIG. 1 is an exemplary block diagram of a data processing system in which the present invention may be implemented.

The present invention may be implemented in a computer system. The computer system may be a client or a server in a client-server environment that is interconnected over a network. With reference now to FIG. 1, an exemplary block diagram of a data processing system is shown in which the present invention may be implemented. Client 100 is an example of a computer, in which code or instructions implementing the processes of the present invention may be located. Client 100 employs a peripheral component interconnect (PCI) local bus architecture. Although the depicted example employs a PCI bus, other bus architectures such as Accelerated Graphics Port (AGP) and Industry Standard Architecture (ISA) may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, small computer system interface SCSI host bus adapter 112, and expansion bus interface 114 are connected to PCI local bus 106 by direct component connection. In contrast, audio adapter 116, graphics adapter 118, and audio/video adapter 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM drive 130. Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system such as Windows XP, which is available from Microsoft Corporation. An object oriented programming system such as Java may run in conjunction with the operating system and provides calls to the operating system from Java programs or applications executing on client 100. "Java" is a trademark of Sun Microsystems, Inc. Instructions for the operating system, the object-oriented programming system, and applications or programs are located on storage devices, such as hard disk drive 126, and may be loaded into main memory 104 for execution by processor 102.

Those of ordinary skill in the art will appreciate that the hardware in FIG. 1 may vary depending on the implementation. Other internal hardware or peripheral devices, such as flash read-only memory (ROM), equivalent nonvolatile memory, or optical disk drives and the like, may be used in addition to or in place of the hardware depicted in FIG. 1. Also, the processes of the present invention may be applied to a multiprocessor data processing system.

For example, client 100, if optionally configured as a network computer, may not include SCSI host bus adapter 112, hard disk drive 126, tape drive 128, and CD-ROM 130. In that case, the computer, to be properly called a client computer, includes some type of network communication interface, such as LAN adapter 110, modem 122, or the like. As another example, client 100 may be a stand-alone system configured to be bootable without relying on some type of network communication interface, whether or not client 100 comprises some type of network communication interface. As a further example, client 100 may be a personal digital assistant (PDA), which is configured with ROM and/or flash ROM to provide non-volatile memory for storing operating system files and/or user-generated data. The depicted example in FIG. 1 and above-described examples are not meant to imply architectural limitations.

The processes of the present invention are performed by processor 102 using computer implemented instructions, which may be located in a memory such as, for example, main memory 104, memory 124, or in one or more peripheral devices 126-130.

Figure 2:
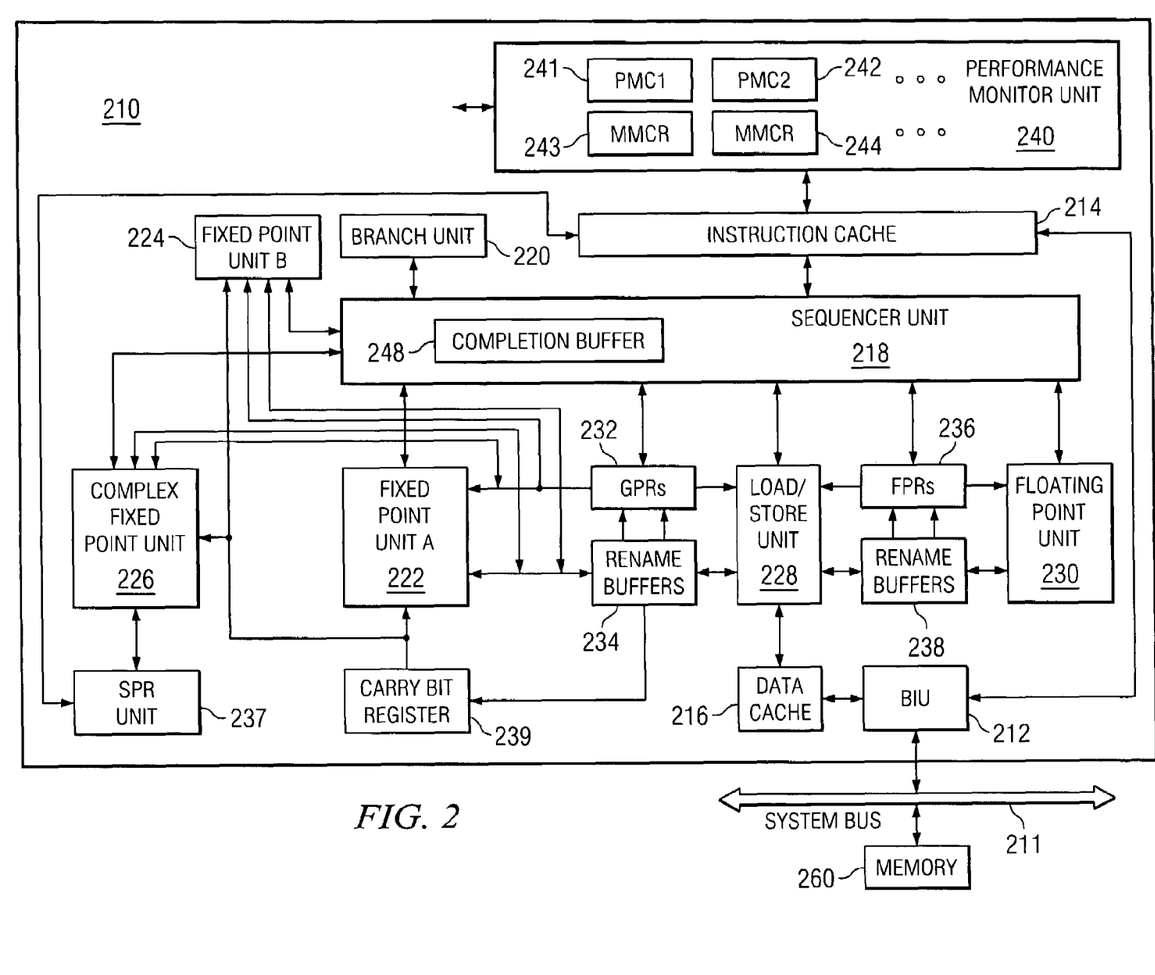
FIG. 2 is an exemplary block diagram of a processor system for processing information in accordance with a preferred embodiment of the present invention.

Turning next to FIG. 2, an exemplary block diagram of a processor system for processing information is depicted in accordance with a preferred embodiment of the present invention. Processor 210 may be implemented as processor 102 in FIG. 1.

In a preferred embodiment, processor 210 is a single integrated circuit superscalar microprocessor. Accordingly, as discussed further herein below, processor 210 includes various units, registers, buffers, memories, and other sections, all of which are formed by integrated circuitry. Also, in the preferred embodiment, processor 210 operates according to reduced instruction set computer ("RISC") techniques. As shown in FIG. 2, system bus 211 is connected to a bus interface unit ("BIU") 212 of processor 210. BIU 212 controls the transfer of information between processor 210 and system bus 211.

BIU 212 is connected to an instruction cache 214 and to data cache 216 of processor 210. Instruction cache 214 outputs instructions to sequencer unit 218. In response to such instructions from instruction cache 214, sequencer unit 218 selectively outputs instructions to other execution circuitry of processor 210.

In addition to sequencer unit 218, in the preferred embodiment, the execution circuitry of processor 210 includes multiple execution units, namely a branch unit 220, a fixed-point unit A ("FXUA") 222, a fixed-point unit B ("FXUB") 224, a complex fixed-point unit ("CFXU") 226, a load/store unit ("LSU") 228, and a floating-point unit ("FPU") 230. FXUA 222, FXUB 224, CFXU 226, and LSU 228 input their source operand information from general-purpose architectural registers ("GPRs") 232 and fixed-point rename buffers 234. Moreover, FXUA 222 and FXUB 224 input a "carry bit" from a carry bit ("CA") register 239. FXUA 222, FXUB 224, CFXU 226, and LSU 228 output results (destination operand information) of their operations for storage at selected entries in fixed-point rename buffers 234. Also, CFXU 226 inputs and outputs source operand information and destination operand information to and from special-purpose register processing unit ("SPR unit") 237.

FPU 230 inputs its source operand information from floating-point architectural registers ("FPRs") 236 and floating-point rename buffers 238. FPU 230 outputs results (destination operand information) of its operation for storage at selected entries in floating-point rename buffers 238.

In response to a Load instruction, LSU 228 inputs information from data cache 216 and copies such information to selected ones of rename buffers 234 and 238. If such information is not stored in data cache 216, then data cache 216 inputs (through BIU 212 and system bus 211) such information from a system memory 239 connected to system bus 211. Moreover, data cache 216 is able to output (through BIU 212 and system bus 211) information from data cache 216 to system memory 239 connected to system bus 211. In response to a Store instruction, LSU 228 inputs information from a selected one of GPRs 232 and FPRs 236 and copies such information to data cache 216.

Sequencer unit 218 inputs and outputs information to and from GPRs 232 and FPRs 236. From sequencer unit 218, branch unit 220 inputs instructions and signals indicating a present state of processor 210. In response to such instructions and signals, branch unit 220 outputs (to sequencer unit 218) signals indicating suitable memory addresses storing a sequence of instructions for execution by processor 210. In response to such signals from branch unit 220, sequencer unit 218 inputs the indicated sequence of instructions from instruction cache 214. If one or more of the sequence of instructions is not stored in instruction cache 214, then instruction cache 214 inputs (through BIU 212 and system bus 211) such instructions from system memory 239 connected to system bus 211.

In response to the instructions input from instruction cache 214, sequencer unit 218 selectively dispatches the instructions to selected ones of execution units 220, 222, 224, 226, 228, and 230. Each execution unit executes one or more instructions of a particular class of instructions. For example, FXUA 222 and FXUB 224 execute a first class of fixed-point mathematical operations on source operands, such as addition, subtraction, ANDing, ORing and XORing. CFXU 226 executes a second class of fixed-point operations on source operands, such as fixed-point multiplication and division. FPU 230 executes floating-point operations on source operands, such as floating-point multiplication and division.

As information is stored at a selected one of rename buffers 234, such information is associated with a storage location (e.g. one of GPRs 232 or carry bit (CA) register 242) as specified by the instruction for which the selected rename buffer is allocated. Information stored at a selected one of rename buffers 234 is copied to its associated one of GPRs 232 (or CA register 242) in response to signals from sequencer unit 218. Sequencer unit 218 directs such copying of information stored at a selected one of rename buffers 234 in response to "completing" the instruction that generated the information. Such copying is called "writeback."

As information is stored at a selected one of rename buffers 238, such information is associated with one of FPRs 236. Information stored at a selected one of rename buffers 238 is copied to its associated one of FPRs 236 in response to signals from sequencer unit 218. Sequencer unit 218 directs such copying of information stored at a selected one of rename buffers 238 in response to "completing" the instruction that generated the information.

Processor 210 achieves high performance by processing multiple instructions simultaneously at various ones of execution units 220, 222, 224, 226, 228, and 230. Accordingly, each instruction is processed as a sequence of stages, each being executable in parallel with stages of other instructions. Such a technique is called "pipelining." In a significant aspect of the illustrative embodiment, an instruction is normally processed as six stages, namely fetch, decode, dispatch, execute, completion, and writeback.

In the fetch stage, sequencer unit 218 selectively inputs (from instruction cache 214) one or more instructions from one or more memory addresses storing the sequence of instructions discussed further hereinabove in connection with branch unit 220, and sequencer unit 218. In the decode stage, sequencer unit 218 decodes up to four fetched instructions.

In the dispatch stage, sequencer unit 218 selectively dispatches up to four decoded instructions to selected (in response to the decoding in the decode stage) ones of execution units 220, 222, 224, 226, 228, and 230 after reserving rename buffer entries for the dispatched instructions' results (destination operand information). In the dispatch stage, operand information is supplied to the selected execution units for dispatched instructions. Processor 210 dispatches instructions in order of their programmed sequence.

In the execute stage, execution units execute their dispatched instructions and output results (destination operand information) of their operations for storage at selected entries in rename buffers 234 and rename buffers 238 as discussed further hereinabove. In this manner, processor 210 is able to execute instructions out-of-order relative to their programmed sequence.

In the completion stage, sequencer unit 218 indicates an instruction is "complete." Processor 210 "completes" instructions in order of their programmed sequence.

In the writeback stage, sequencer 218 directs the copying of information from rename buffers 234 and 238 to GPRs 232 and FPRs 236, respectively. Sequencer unit 218 directs such copying of information stored at a selected rename buffer. Likewise, in the writeback stage of a particular instruction, processor 210 updates its architectural states in response to the particular instruction. Processor 210 processes the respective "writeback" stages of instructions in order of their programmed sequence. Processor 210 advantageously merges an instruction's completion stage and writeback stage in specified situations.

In the illustrative embodiment, each instruction requires one machine cycle to complete each of the stages of instruction processing. Nevertheless, some instructions (e.g., complex fixed-point instructions executed by CFXU 226) may require more than one cycle. Accordingly, a variable delay may occur between a particular instruction's execution and completion stages in response to the variation in time required for completion of preceding instructions.

Completion buffer 248 is provided within sequencer 218 to track the completion of the multiple instructions which are being executed within the execution units. Upon an indication that an instruction or a group of instructions have been completed successfully, in an application specified sequential order, completion buffer 248 may be utilized to initiate the transfer of the results of those completed instructions to the associated general-purpose registers.

In addition, processor 210 also includes performance monitor unit 240, which is connected to instruction cache 214 as well as other units in processor 210. Operation of processor 210 can be monitored utilizing performance monitor unit 240, which in this illustrative embodiment is a software-accessible mechanism capable of providing detailed information descriptive of the utilization of instruction execution resources and storage control. Although not illustrated in FIG. 2, performance monitor unit 240 is coupled to each functional unit of processor 210 to permit the monitoring of all aspects of the operation of processor 210, including, for example, reconstructing the relationship between events, identifying false triggering, identifying performance bottlenecks, monitoring pipeline stalls, monitoring idle processor cycles, determining dispatch efficiency, determining branch efficiency, determining the performance penalty of misaligned data accesses, identifying the frequency of execution of serialization instructions, identifying inhibited interrupts, and determining performance efficiency. The events of interest also may include, for example, time for instruction decode, execution of instructions, branch events, cache misses, and cache hits.

Performance monitor unit 240 includes an implementation-dependent number (e.g., 2-8) of counters 241-242, labeled PMC1 and PMC2, which are utilized to count occurrences of selected events. Performance monitor unit 240 further includes at least one monitor mode control register (MMCR). In this example, two control registers, MMCRs 243 and 244 are present that specify the function of counters 241-242. Counters 241-242 and MMCRs 243-244 are preferably implemented as SPRs that are accessible for read or write via MFSPR (move from SPR) and MTSPR (move to SPR) instructions executable by CFXU 226. However, in one alternative embodiment, counters 241-242 and MMCRs 243-244 may be implemented simply as addresses in I/O space. In another alternative embodiment, the control registers and counters may be accessed indirectly via an index register. This embodiment is implemented in the IA-64 architecture in processors from Intel Corporation. Counters 241-242 may also be used to collect branch statistics per instruction when a program is executed.

As described above, the present invention provides a method, apparatus, and computer instructions for local program code reorganization using branch count per instruction hardware. Program code reorganization may include reorganization of a single instruction or a set of instructions within a program, also known as a block of code. Instructions within a block of code may be contiguous or non-contiguous. The present invention provides hardware counter, such as counters 241 and 242 in FIG. 2, to count the number of times a branch is taken when a branch instruction is executed.

In a preferred embodiment, the present invention allows a program or application to autonomically determine whether program code should be reorganized at run time by examining the branch count per instruction statistics provided by hardware counters. If code is to be reorganized, the performance monitoring program can use various techniques to halt execution of the instructions and then reorganizes the code by swapping instructions. Instruction is halted, for example, by causing a branch to branch to itself until modification of the code is complete, in order to ensure that the processor has stopped executing the code that is to be modified. When the relevant code has been modified and can be safely executed, the branch to self is removed and normal execution resumes. This mechanism allows a program to interrupt a normal execution and reorganize program code at run time.

Figure 3A:
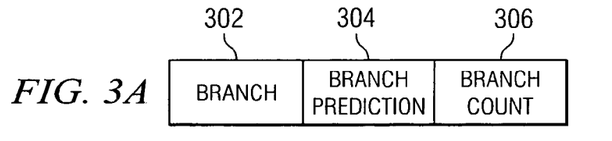
FIG. 3A is an exemplary diagram illustrating example branch statistic fields in accordance with a preferred embodiment of the present invention.

Turning to FIG. 3A, an exemplary diagram illustrating example branch statistic fields is depicted in accordance with a preferred embodiment of the present invention. In this illustrative example, there are three branch statistic fields, shown as branch field 302, branch prediction field 304, and branch count field 306 associated with a branch instruction. These branch statistics fields may be stored in a separate area of storage, such as performance instrumentation shadow cache. Performance instrumentation shadow cache may be implemented using any storage device, such as, for example, a system memory, a flash memory, a cache, or a disk. Branch field 302 indicates whether a branch is taken or not last time the branch instruction is executed. Branch prediction field 304 indicates the branch prediction made based on the branch count. There may be three values associated with the branch prediction field. A value of "00" indicates that no previous data is collected for the branch instruction. A value of "01" indicates a branch is predicted to be taken for the branch instruction, and a value of "02" indicates a branch is predicted to be not taken for the branch instruction. Branch prediction is normally performed before the branch is executed. Branch count field 306 indicates the number of times a branch is taken when the branch instruction is executed. Hardware counters increment or decrement this field based on whether a branch is taken or not when the branch instruction is executed.

Figure 3B:
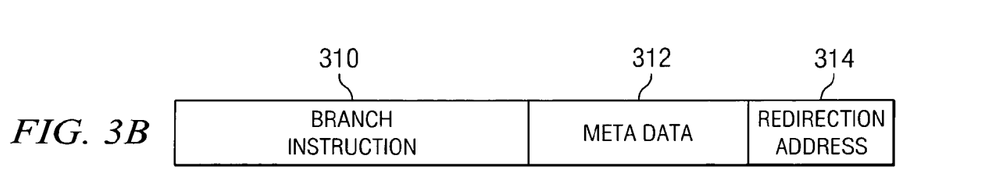
FIG. 3B is an exemplary diagram illustrating an example branch instruction in accordance with a preferred embodiment of the present invention.

With reference to FIG. 3B, an exemplary diagram illustrating an example branch instruction is depicted in accordance with a preferred embodiment of the present invention. As depicted in FIG. 3B, branch instruction 310 is associated with two different meta data, meta data 312 and redirection address field 314. Meta data 312 represents the branch statistics fields as described in FIG. 3A, which is associated with branch instruction 310. Redirection address field 314 indicates that meta data is associated with branch instruction 310.

Figure 4:
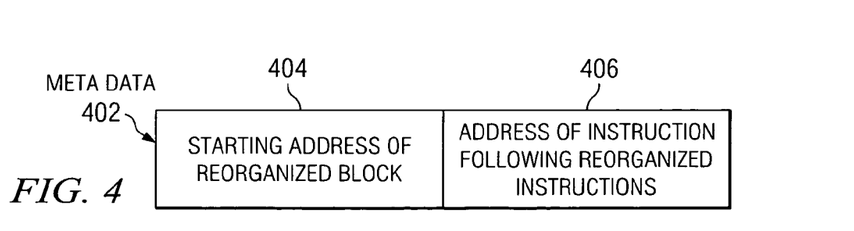
FIG. 4 is an exemplary diagram illustrating an example meta data in accordance with a preferred embodiment of the present invention.

With reference now to FIG. 4, an exemplary diagram illustrating an example meta data is depicted in accordance with a preferred embodiment of the present invention. In this illustrative example, meta data 402 may be stored in a dedicated memory location where it is accessible to the processor. Meta data 402 includes two pointers. One pointer points to the starting address of the reorganized code block 404. Another pointer points to the address of the instruction following the branch instructions in the original code 406. Pointer 404 is examined by the processor when a branch instruction associated with meta data, such as redirection address field 314 in FIG. 3B, is executed. Pointer 506 is examined by the processor when execution of the reorganized instruction is complete.

In a preferred embodiment, the present invention allows a program to swap the location of the "then", and "else" statements of an "if/then/else" statement within the program at run time based on the branch count per instruction statistics provided by hardware counters. An "if" statement specifies a condition that is examined when a branch instruction is executed. A "then" statement is an instruction that is executed when the "if" condition is satisfied. An "else" statement is an instruction that is executed when the "if" condition is not satisfied. Typically, an "else" statement follows the branch instruction in the normal execution sequence. For example, if the program determines that code should be reorganized at run time, the program may swap the location of "then" with the "else" statements, in order to allow more instructions to be executed contiguously before a branch is taken.

Such swapping of then/else statements also requires modification of the condition. For example, in a simple case with a single condition "Value1 greater than 0," the "then" statement would execute if Value1 is greater than zero, and the "else" statement would execute if Value1 is not greater than zero. Hence, swapping the "then" and "else" statements would also require that the condition "Value1 greater than 0" be modified to "Value1 less than or equal to 0." In this way, the "then" statement will be executed under the same conditions as prior to code modification, and likewise with the "else" statement.

Figure 5:
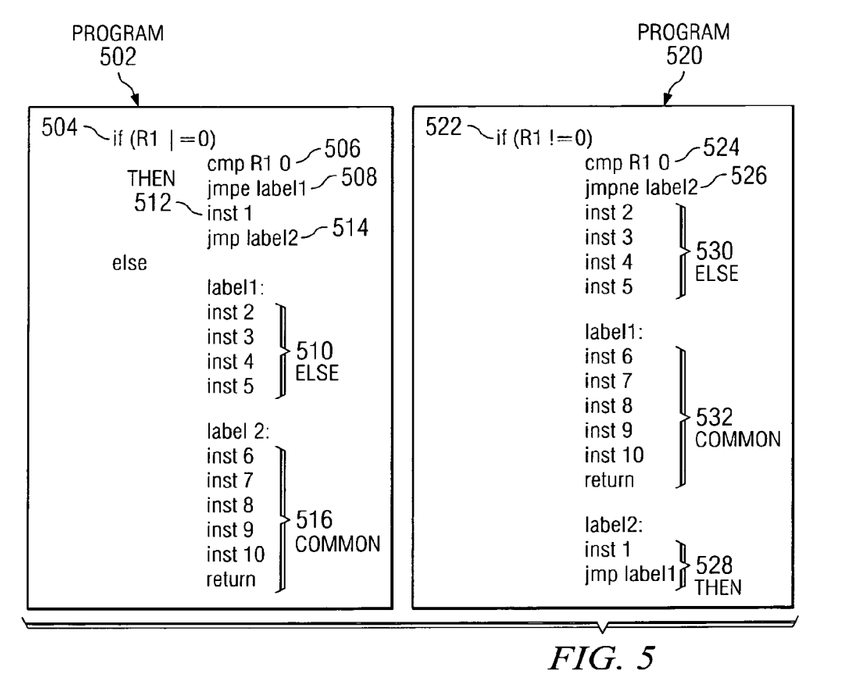
FIG. 5 is an exemplary diagram illustrating program code reorganization by swapping "if", "then", "else" statements at run time in accordance with a preferred embodiment of the present invention.

Turning next to FIG. 5, an exemplary diagram illustrating program code reorganization by swapping "then" and "else" statements at run time is depicted in accordance with a preferred embodiment of the present invention. In this illustrative example, program 502 examines "if" condition 504 to check if the value in register R1 is not equal to zero. If "if" condition 504 is satisfied, a comparison is made by cmp instruction 506 to compare the value of register R1 and 0. If the value of register R1 is equal to 0, jmpe instruction 508 jumps to code block label 1 510. Code block label 1 510, which is the "else" statements, includes instructions 2, 3, 4, and 5. If the value of register R1 is not equal to 0, instruction 1 512, which is the "then" statement, is executed. Regardless of whether the "then" or the "else" statements are executed, code block label 2 516 is executed. Code block label 2 516 includes instructions 6, 7, 8, 9, 10 and return. Code block level 2 516 is common to either condition.

By examining the branch count per instruction statistics provided by the hardware counters of the present invention, such as branch field 302 and branch prediction field 304 derived from the branch count field 306 as described in FIG. 3, program 502 may notice that code block label 1 510 is executed in multiple executions, which makes code block label 1 510 a "hot spot". Thus, program 502 may reorganize the location of code block label 1 510 instructions at run time and the reorganized program is shown as program 520 in FIG. 5.

Program 520 includes the same "if" condition 522 and cmp instruction 524. However, the condition of jmpe instruction 508 is modified to become a jmpne instruction 526. Jmpne instruction 526 jumps to code block label 2 528 only if the value of register R1 is not equal to 0. Instructions 2, 3, 4, and 5 530 that are originally located in code block label 1 510 are now relocated to be executed after jumpne instruction 526 to allow more contiguous code to be executed in sequence. Code block level 2 516 that is common to either condition is also relocated to code block label 1 532, which is executed after instructions 2, 3, 4 and 5 530 contiguously.

Notice that the "else" condition 540 in program 502 is no longer required, since modifying the condition of jmpe statement 508 (jump if equal) to jmpne statement 526 (jump if not equal) in program 520 and relocating instructions 2, 3, 4 and 5 530 to be executed after jmpne instruction 526 allows "else" statements 530 to be executed right after the comparison is made.

Thus, by swapping the locations of "then" statements 512 and "else" statements 510 and modifying the condition of jmpe statement 508, program 520 allows more instructions to be executed contiguously because "else" instructions 530 are now located closer to "if" condition 522.

Figure 6:
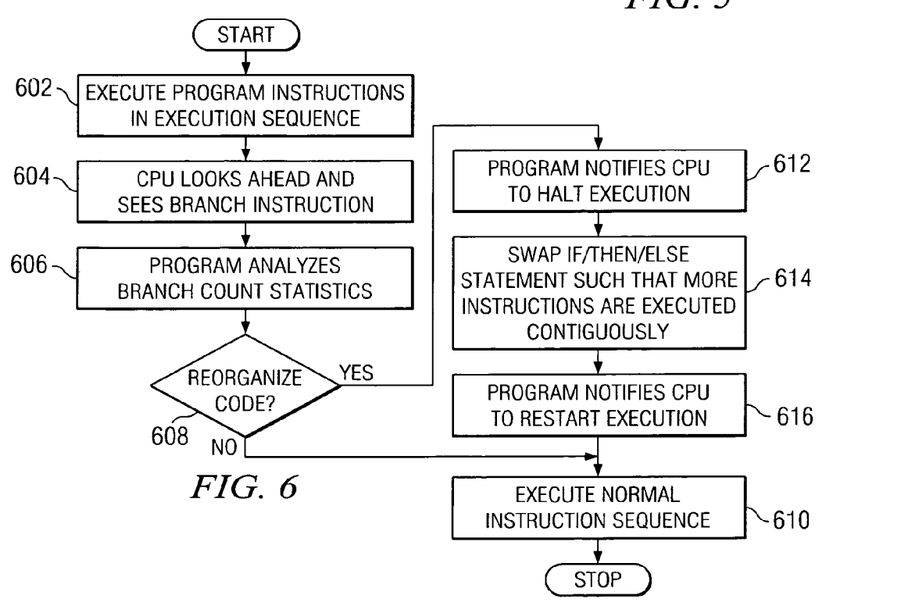
FIG. 6 is a flowchart process outlining an exemplary process for local program code reorganization using branch count per instruction hardware at run time in accordance with a preferred embodiment of the present invention.

Turning next to FIG. 6, a flowchart process outlining an exemplary process for local program code reorganization using branch count per instruction hardware at run time is depicted in accordance with a preferred embodiment of the present invention. In this example illustration, the process begins when a CPU executes program instructions in execution sequence (step 602). The CPU then looks ahead and sees a branch instruction (step 604). Next, the program analyzes branch count per instruction statistics provided by the hardware counters (step 606) by examining the branch count field associated with the instruction. Based on the number of times a branch is taken, a determination is made by the program whether or not to reorganize code (step 608). If the program determines not to reorganize code, the processor continues to execute normal program instructions following the normal execution sequence (step 610), the process terminating thereafter.

If the program determines to reorganize code, the program notifies the processor to halt execution of instructions (step 612) and swap the locations of the "then" and "else" statements such that more instructions are executed contiguously (step 614). Note that this step preferably includes modifying the condition of the "if" statement as well, such that the "then" instruction occurs under the same circumstances as before modification, as well as the "else" statement, as described above. Once the reorganization is complete, the program notifies the processor to restart execution of instructions (step 616) and the processor continues to execute normal program instructions following the normal execution sequence (step 610), the process terminating thereafter.

Thus, the present invention provides branch count per instruction hardware to count the number of times a branch is taken. Using branch count per instruction statistics generated by the hardware counters, the program may determine whether or not to reorganize code locally at run time. A program may autonomically reorganize code by swapping the branch instruction with other instructions to optimize program performance. In an alternative embodiment, a program may swap the locations of the "then" and "else" statements (as well as changing the condition) to allow more instructions to be executed contiguously before taking a branch. Thus, the number of branches taken is minimized without modifying underlying program code.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of autonomically reorganizing code of a computer program, comprising the steps of:
   identifying a plurality of branch instructions for a computer program being compiled;

monitoring branch count per instruction statistics, wherein the branch count per instruction statistics are generated from the results of a set of hardware counters associated with the branch instructions that autonomically count branches taken, that are executed in parallel, per instruction of the computer program;

determining whether a block of code is to be reorganized based on a number of times a branch is taken per instruction, wherein the block of code comprises a set of instructions; and in response to determining that a block of code is to be reorganized, locally reorganizing the block of code such that fewer branches are taken.

2. The method of claim 1, wherein prior to the step of reorganizing the block of code, execution of the computer program is halted.

3. The method of claim 1, wherein reorganization of the block of code results in instructions of the block of code being more contiguous.

4. The method of claim 1, wherein reorganizing the block of code is performed locally by modifying an if/then/else clause condition.

5. The method of claim 1, wherein reorganization of the block of code is performed locally by switching a location of a then statement of an if/then/else clause with a location of an else statement of the if/then/else clause of a branch instruction of the block of code.

6. A computer system for autonomically reorganizing code of a computer program, comprising:

identifying a set of branch instructions for a computer program being compiled;

a set of hardware counters associated with the set of branch instructions of the computer program, wherein the hardware counters are used to autonomically generate branch count per instruction statistics of the branch instructions that are executed in parallel; and a block of code including at least one branch instruction of the set of branch instructions;

wherein the block of code is locally reorganized; and wherein the branch count per instruction statistics comprise a number of times a branch is taken per instruction, and wherein the number of times a branch is taken per instruction is used to determine whether to autonomically reorganize a block of code.

7. The system of claim 6, wherein the block of code is locally reorganized by modifying an if/then/else clause condition.

8. The system of claim 6, wherein the block of code is locally reorganized by switching a location of a then statement of an if/then/else clause with a location of an else statement of the if/then/else clause of an instruction of the block of code.

9. The system of claim 6, wherein execution of the computer program is halted while the block of code is locally reorganized.

10. The system of claim 6, wherein local reorganization of the block of code results in fewer branches being taken during execution of the program.

11. A computer program product in a recordable computer readable medium for autonomically reorganizing code of a computer program, comprising:

first instructions for identifying a plurality of branch instructions for a computer program code being compiled;

second instructions for monitoring branch count per instruction statistics, wherein the branch count per instruction statistics are generated from the results of a set of hardware counters associated with the branch instructions that autonomically count branches taken per instruction of the computer program;

third instructions for determining whether a block of code is to be reorganized based on a number of times a branch is taken, that are executed in parallel, per instruction, wherein the block of code comprises a set of instructions; and fourth instructions for, in response to determining that a block of code is to be reorganized, locally reorganizing the block of code such that fewer branches are taken.

12. The computer program product of claim 11, wherein prior to reorganizing the block of code, execution of the computer program is halted.

13. The computer program product of claim 11, wherein reorganizing the block of code results in instructions of the block of code being more contiguous.

14. The computer program product of claim 11, wherein reorganizing the block of code is performed locally by modifying an if/then/else clause condition.

15. The computer program product of claim 11, wherein reorganizing the block of code is performed locally by switching a location of a then statement of an if/then/else clause with a location of an else statement of the if/then/else clause of an instruction of the block of code.

* * * * *